JAMES IVES.
Improvement in Modes of Lubricating Axles.

No. 114,298. Patented May 2, 1871.

Witnesses
R. T. Campbell
J. A. Campbell

Inventor
James Ives
by
Munn, Kenwick & Lawrence

United States Patent Office.

JAMES IVES, OF MOUNT CARMEL, CONNECTICUT.

Letters Patent No. 114,298, dated May 2, 1871.

IMPROVEMENT IN THE MODES OF LUBRICATING AXLES.

The Schedule referred to in these Letters Patent and making part of the same.

*To all whom it may concern:*

Be it known that I, JAMES IVES, of Mount Carmel, in the county of New Haven and State of Connecticut, have invented a new and improved Mode of Lubricating Axles; and I do hereby declare that the following is a full, clear, and exact description thereof, reference being had to the accompanying drawing making part of this specification, in which—

Figure 4 is an end view of the axle-box.

Similar letters of reference indicate corresponding parts in the several figures.

This invention relates to axle-boxes for the wheels of vehicles, and has for its object improving an axle-box by utilizing one of its ears as a conduit for the supply of oil to the axle, as will be hereinafter explained.

The following description will enable others skilled in the art to understand my invention.

In the accompanying drawing—

A represents an axle-box, which, with the following exceptions, may be made in the usual well-known manner.

Figure 1:
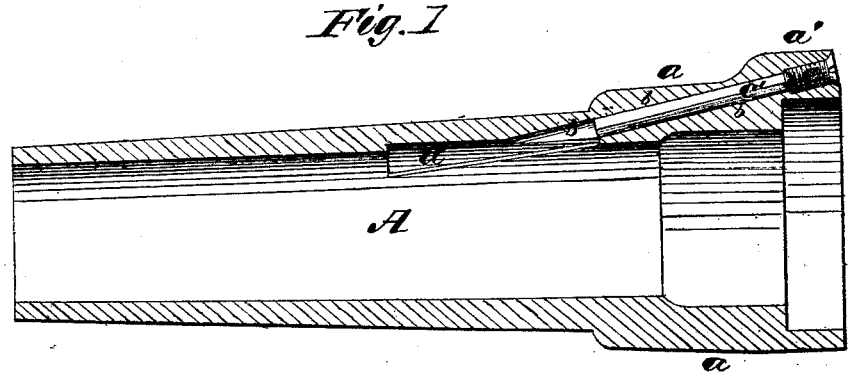
Figure 1 is a diametrical section through an axle-box having my improvement applied to it.
Figure 2:
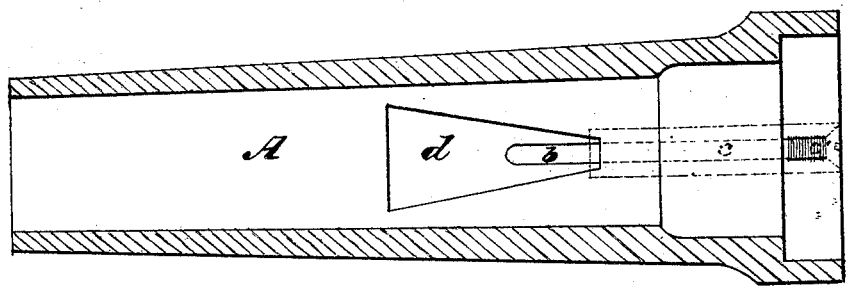
Figure 2 is a diametrical section through the box taken at right angles to the sectional plane of fig. 1.
Figure 3:
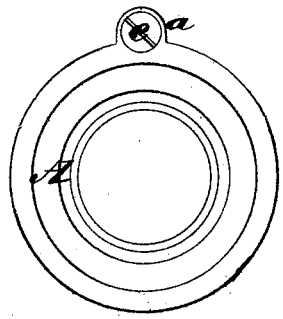

One of the ears $a$ is extended to the end of the box so as to form a narrow enlargement, $a'$, which is continuous with said ear, and through which a hole, $b$, is formed that is inclined, as shown in fig. 1.

This hole or conduit $b$ leads from the outer terminus of the ear-extension, $a'$, down to a fan-shaped depression, $d$, which is made into the inner surface of the box A, at or near the middle of its length.

The hole or conduit $b$ is screw-tapped for a short distance to receive a screw-threaded portion, which is formed on a stem, $c'$.

The reduced portion or stem $c'$ of the screw $c$ is intended to serve as a plunger, and should extend to the inner extremity of the conduit $b$, as shown in fig. 1.

The screw and its stem can be removed or inserted by means of a common screw-driver.

It will be seen, from the above description, that the inclined or oblique conduit affords an excellent means for supplying oil to an axle without removing the wheel therefrom; also, that the expanded chamber $d$ will receive the oil and spread it upon the surface of the axle in a broad film; also, that the screw and its stem or plunger serve as a means for stopping the end of the conduit $b$, while the stem serves as a plunger or piston for compelling oil put into the conduit $b$ to flow into chamber $d$, and also for preventing the conduit from becoming clogged, or clearing the same if clogged.

I do not claim an oil-chamber which is formed in the manner shown in the rejected application of E. Burts, November, 1853, and of R. Platt, April 30, 1859. Neither do I claim an incline passage closed by a screw-plug; but What I do claim as my invention, and desire to secure by Letters Patent, is—

1. The ordinary axle-skein or box improved without changing the form of the axle or materially changing the construction of the skein or box, by constructing one of the ears or lugs $a$ with an extension, $a'$, and perforating said ear obliquely so as to form the conduit $b$, and terminating said conduit in the form of a flaring or expanded chamber, $d$, which chamber is formed within the inner circumference of the axle-box, all in the manner substantially as described and shown.

2. The combination of the combined plug and piston, partly screw-threaded, with the inclined conduit $b$ and the expanded chamber $d$, all in the manner described and shown.

Witnesses:
    J. H. KINGSLEY,
    THOMAS CANNON.

JAMES IVES.